Dec. 14, 1926.
I. M. PEASE
1,610,813
PAD ATTACHING MEANS
Filed Feb. 24, 1925
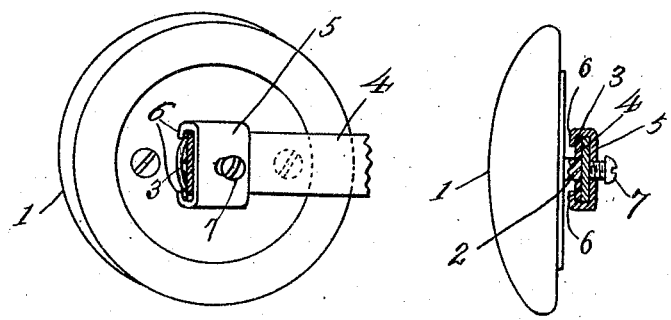
*Fig. 1.*   *Fig. 2.*
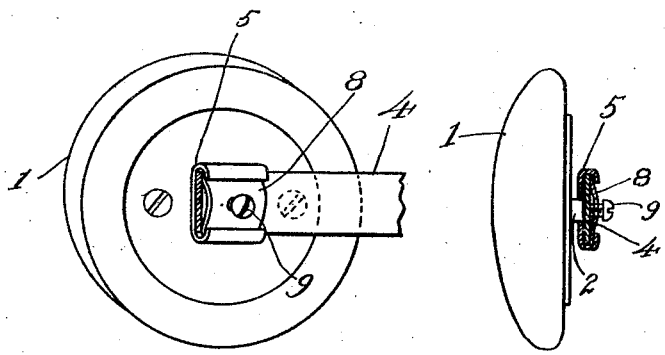
*Fig. 3.*   *Fig. 4.*
INVENTOR:
Isaac M. Pease,
BY Arthur H. Ewald,
ATTORNEY.

Patented Dec. 14, 1926.

1,610,813

UNITED STATES PATENT OFFICE.

ISAAC M. PEASE, OF CINCINNATI, OHIO, ASSIGNOR TO THE OHIO TRUSS COMPANY, A CORPORATION OF OHIO.

PAD-ATTACHING MEANS.

Application filed February 24, 1925. Serial No. 11,209.

My invention relates to pad attaching means and has particular reference to the provision of simple and efficient means for securing pads to trusses.

The principal object of this invention is to provide effective and inexpensive means whereby the pad of a truss may be securely and, if desirable, adjustably secured to the spring or other portion of a truss.

Further objects of the invention will appear from the following detailed description thereof.

In the drawings:

Figure 1 is a perspective of a truss pad provided with one form of attaching means constructed in accordance with this invention, the same being shown in assembly with a truss spring.

Figure 2 is a cross-section of the attaching means, illustrated in Figure 1.

Figure 3 is a perspective view of a modified form of the invention.

Figure 4 is a sectional view of the modification, illustrated in Figure 3.

The numeral 1 indicates a truss pad. Said pad is provided with a shank 2 by means of which it is attached to the truss spring. The shank 2 and pad 1 may be secured together by means of a ball and socket arrangement, not shown, familiar in the art, or any of the other customary rigid or adjustable means. The outer end of the shank 2 is provided with a plate 3, preferably integrally formed with the shank. The plate 3 is provided with substantially parallel edges adapted to align with the edges of the truss spring 4 when the parts are assembled.

The numeral 5 indicates a channelled clip provided with inturned flanges 6—6. The clip is provided with a central threaded opening for a set screw 7. The channel of the clip is of such dimension as to receive slidably the truss spring 4 and the plate 3, the inturned flanges 6 being arranged to engage the surface of the plate, as shown in Figure 2.

The assembly of the attaching means disclosed in Figures 1 and 2 is clearly shown in said figures. When the clip has been placed upon the truss spring 4 and the pad 1 attached by means of sliding the plate 3 inside the flanges 6—6, the set screw 7 is tightened, thus securely fastening the parts in said assembly.

In Figures 3 and 4, I have disclosed a modification, wherein the flanged clip 5 is secured to the shank 2 of the pad 1. As in the construction shown in Figures 1 and 2, the clip 5 in the modification is adapted to receive the truss spring 4 between its flanges; a spring plate 8 provided with a threaded opening for a set screw 9 is adapted to fit within the flanges of the clip. When in assembly, the set screw 9 is tightened, thus securely fastening the parts together.

Various modifications in the construction as above described may be made without departing from the spirit and scope of the invention as defined in the appended claims.

Having thus fully described my invention, what I claim as new and desire to secure by Letters Patent is:

1. In combination with a truss spring, pad attaching means comprising a channelled clip adapted to receive a truss spring, inturned flanges on said clip, a plate having parallel edges adapted to align with the edges of said spring, said plate being adapted to fit between the flanges of said clip and to bear on said spring, and means for tightening said clip and plate together.

2. Pad attaching means comprising in combination with a pad having an attaching shank, a channelled clip on said shank, said clip being provided with inturned flanges adapted to receive a truss spring, a plate adapted to fit between said flanges and bear on said spring, and means for tightening said parts together.

ISAAC M. PEASE.